United States Patent [19]

Wadge et al.

[11] 4,033,704
[45] July 5, 1977

[54] DESTRATIFICATION DEVICE

[75] Inventors: James C. Wadge, Golden; Henry T. Falvey, Conifer; Perry L. Johnson, Lakewood, all of Colo.

[73] Assignee: The United States of America as represented by the Secretary of the Interior, Washington, D.C.

[22] Filed: Nov. 11, 1976

[21] Appl. No.: 741,075

[52] U.S. Cl. .................................. 415/80; 61/1 R; 259/8; 261/35; 417/424
[51] Int. Cl.² ..................... F04B 17/00; F04B 37/10
[58] Field of Search .......... 61/1 R, 6; 261/35, 201, 261/120; 259/7, 8, 97, 23, 24, DIG. 17, 42, 43; 415/80, 81; 417/424, 337, 375

[56] References Cited

UNITED STATES PATENTS

| | | | |
|---|---|---|---|
| 2,597,931 | 5/1952 | Hance | 61/6 |
| 3,667,873 | 6/1972 | Cramer, Jr. | 417/424 |

Primary Examiner—Paul R. Gilliam
Assistant Examiner—Alex Grosz
Attorney, Agent, or Firm—Thomas Zack; Donald Gardiner

[57] ABSTRACT

A device for destratifying bodies of water for controlling water quality parameters. The device includes an elongated hollow shroud within a cylindrical pipe that is capable of being supported in a vertical position within the body of water. The shroud is mounted on a center hollow drive shaft. A reactive propulsion driven rotary arm disposed in the plenum of the shroud is driven by pressurized fluid. Within the pipe, but outside of and near the lower end of the shroud's drive shaft, an impeller forces water upwardly and axially around the shroud to the water's surface. The reactive propulsion means is preferably driven by pumped air, whereby the effect of the pressurized air rotates the arm and the impeller fixed to the common drive shaft. This action aids in destratifying the body of water. A series of guide vane blades may be interposed on the same drive shaft between the impeller and the shroud to reduce the turbulence of the water exiting from the impeller.

12 Claims, 12 Drawing Figures

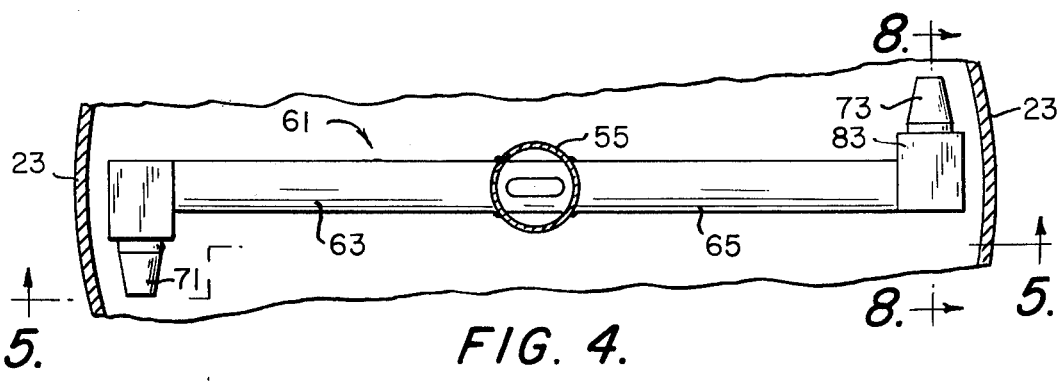
FIG. 4.
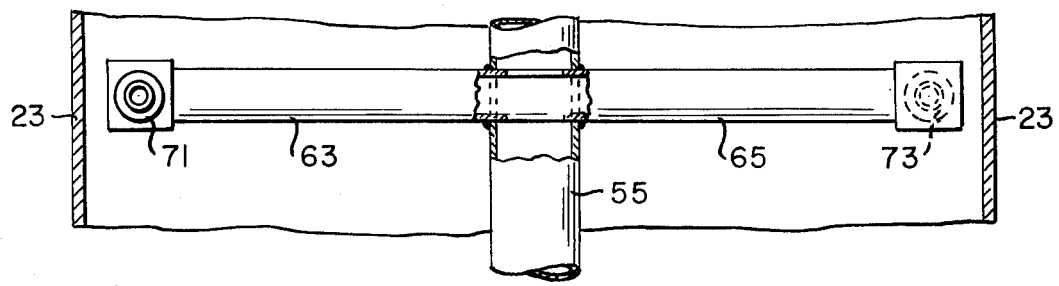
FIG. 5.
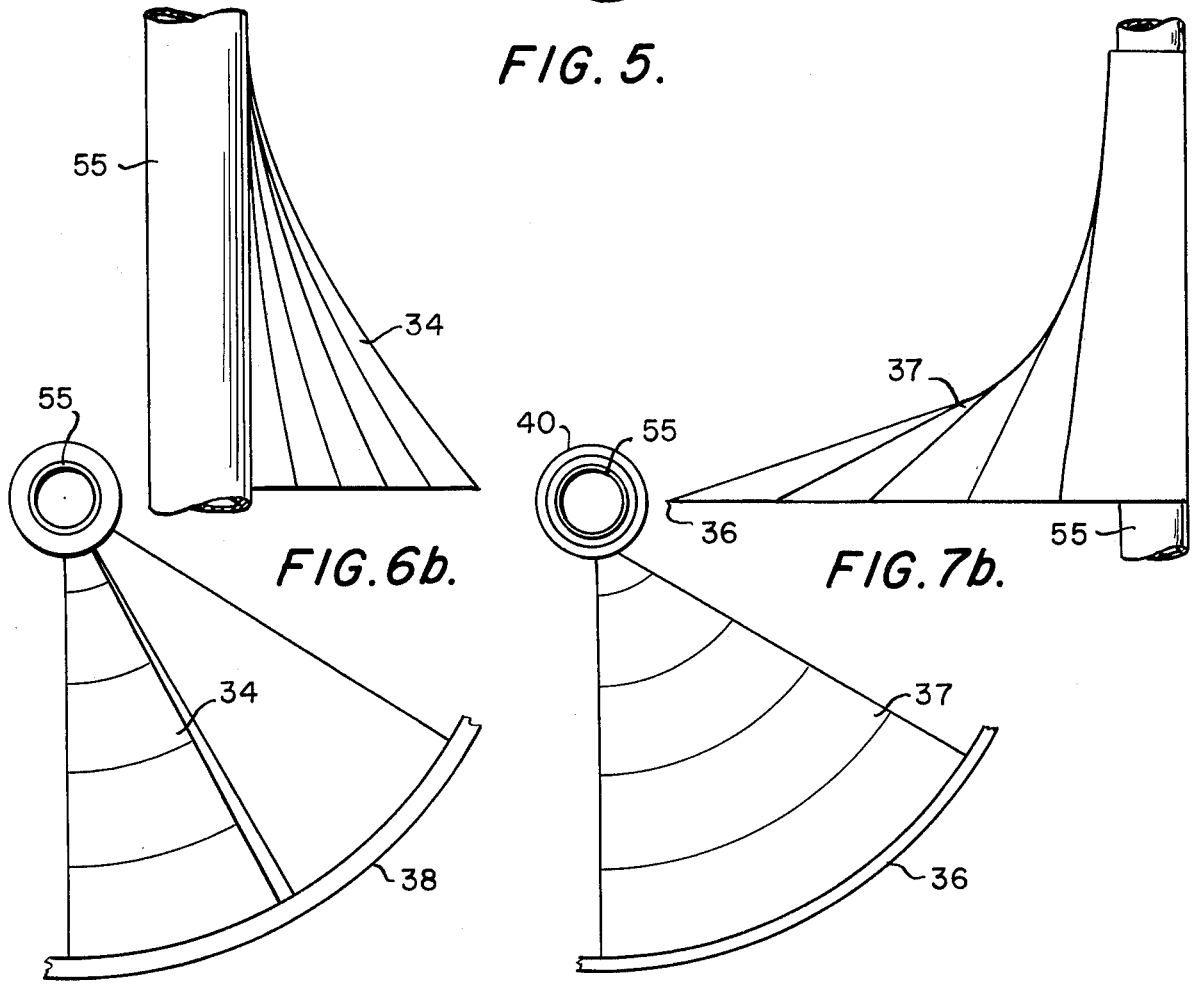
FIG. 6b.  FIG. 7b.
FIG. 6a.  FIG. 7a.

DESTRATIFICATION DEVICE

BACKGROUND OF THE INVENTION

1. Field of the Invention

The present invention relates generally to the field of prior art involving water control in lakes, reservoirs and similar relatively still bodies of water. More particularly, the present invention involves the control of temperature, dissolved oxygen, chemicals and other water quality parameters which are necessary for maintaining and promoting aquatic ecology.

2. Description of the Prior Art

It is well known that bodies of water, particularly still bodies of water such as reservoirs and ponds, experience a condition known as stratification or vertical variation of basic water quality parameters such as temperature, dissolved oxygen, chemicals, turbulence, and the like. This condition of stratification may be undesirable and detrimental to the delicate ecological balance of aquatic life. For example, the amount of dissolved oxygen in a given body of water is an important parameter which is critical for the survival and growth of many aquatic organisms, plants, and fish. The absence or an insufficient amount of dissolved oxygen in all or certain strata of the water body inevitably leads to anaerobic decay or organic matter and results in water pollution.

The most important method by which oxygen is added and dissolved within a body of water is through the mechanism of atmospheric aeration. Such aeration normally occurs naturally when a body of water is agitated by air currents and water motion characteristics such as normally manifested in a moving stream or river. The presence of various chemicals, chemical reactions and photosynthesis in plants also contribute to the addition of dissolved oxygen in a body of water.

The process of atmospheric aeration can also be effected artificially by oxygenating a body of water with air diffusers, mechanical aerators or other such devices which essentially agitate the water so that it is turned over constantly to make contact with available oxygen in the air. In addition to achieving the necessary dissolved oxygen balance in a body of water, these devices and methods also serve to destratify the other critical water quality parameters such as temperature, chemical content and the like. In this manner, the biological and chemical factors necessary for aquatic ecology can be uniformly and homogeneously maintained.

Though the prior art has suggested many forms of destratification devices, most of which are directed at achieving atmospheric aeration, such devices have been found lacking in one respect or another. For example, it is known to float an electric powered spray head on the surface of the water for the purpose of ejecting the water into the atmosphere for aeration purposes. However, such devices do not serve to effectively overcome the stratification problem that normally exists from the surface down to the bottom of the water body. Other diffusers and agitators have been proposed for stirring and turning over bodies of water, but they too are lacking in overall efficiency when it is desired that destratification be achieved uniformly.

SUMMARY OF THE INVENTION

It is, therefore, an object of the present invention to provide for an improved destratification device which is simple in construction and economical to manufacture.

It is a further object of the present invention to provide a destratification device which can be utilized below the surface of a body of water, thereby eliminating or minimizing hazards to navigation and avoiding the damaging effects of wind and waves.

The present invention serves to overcome the disadvantages of known destratification systems and achieve the foregoing objects by providing for a destratification device which is suspended within the body of water. A reactive propulsion arm operated is disposed within the shroud's plenum such that when air from the surface is utilized to actuate the reactive propulsion means from a pressure source, the effect is to rotate it and also the impeller fixed to the same drive shaft. The motion of the impeller serves to axially pump water through an outer shell or pipe and around the shroud from the lower portion to the upper portion of the body of water, thereby effectively destratifying and rendering more uniform the many water quality parameters.

Other objects, features, and advantages of the present invention will be apparent from the following description of the preferred embodiments thereof, with reference to the accompanying drawings, which form a part of this specification, wherein like reference characters designate corresponding parts of the several views.

BRIF DESCRIPTIONS OF THE DRAWINGS

FIG. 4 is an enlarged fragmentary horizontal sectional view of the propulsion arm and its drive shaft taken on the line 4—4 of FIG. 3.

FIG. 5 is a fragmentary vertical sectional view, taken on the staggered section line 5—5 of FIG. 4.

FIG. 6a is an enlarged top view of one of the twelve impeller blades.

FIG. 6b is a side view of the same impeller blade shown in FIG. 6a.

FIG. 7a is an enlarged top view of one of the six guide vanes.

FIG. 7b is a side view of the same vane illustrated in FIG. 7a.

DETAILED DESCRIPTION OF THE PREFERRED EMBODIMENTS

Figure 1:
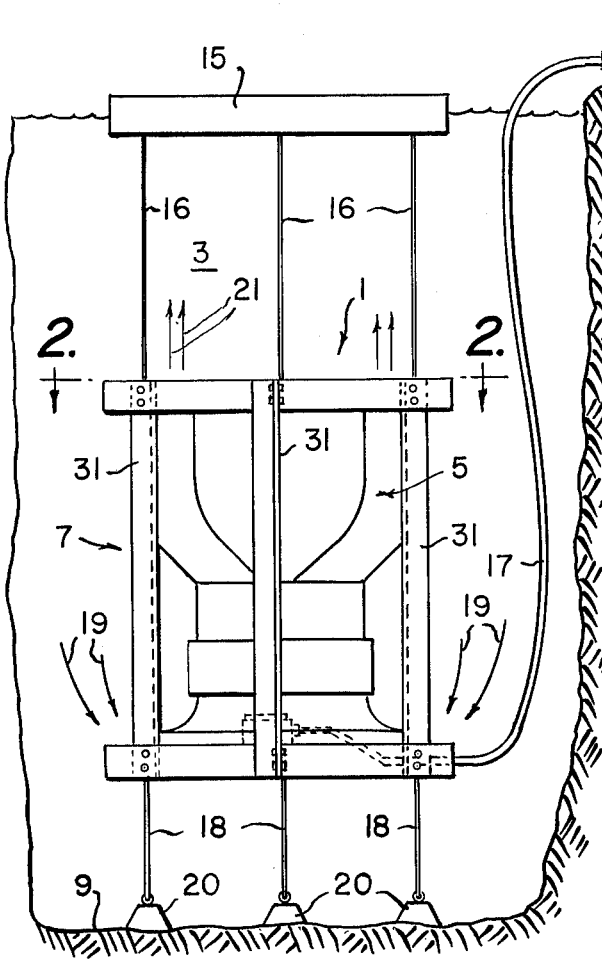
FIG. 1 is a diagrammatic illustration showing with its outer cylindrical housing removed, an application of the destratification device of the present invention.

As seen in FIG. 1, a destratification device 1 embodying the present invention is shown suspended within the body of water 3 to be destratified. Device 1 includes an elongate shroud 5 which forms generally a closed plenum to the surrounding water. A frame 7 serves to support shroud 5 in a substantially vertical orientation with the lower end thereof suspended from the bottom 9 of water body 3. A fluid pump 11 may be disposed on ground surface 13 for the purpose of operating device 1. Preferably, this may be achieved by directing pressurized air by the pump 11 through the conduit 17 to the device. Alternatively, pump 11 may be utilized to direct pressurized water through output conduit 17 for the purpose of operating device 1. This water may be obtained by inserting an intake tube into the water body. As indicated by arrows 19, water in the vicinity of device 1 adjacent bottom 9 of water body 3 is taken in and around the lower end of shroud 5 and forced upwardly and axially thereabout for exit between the upper end of shroud 5 and shell 33, as indicated by arrows 21, towards the upper surface of water body 3. The air pressurized by pump 11 is passed through output conduit 17 is also passed out the upper end of shroud 5 in the open space between it and shell 33. Such air serves greatly to assist in the destratification process so that the water quality parameters of water body 3 can be quickly destratified and rendered more uniform. Four rigid lines 16 may be used to attach the preferred embodiment of the invention to the floating platform 15 at its top portion and four rigid lower frame members 18 may be used to connect it to the four weighted anchors 20 on the water's bottom. In this way the device is prevented from rotating by counter forces.

Figure 2:
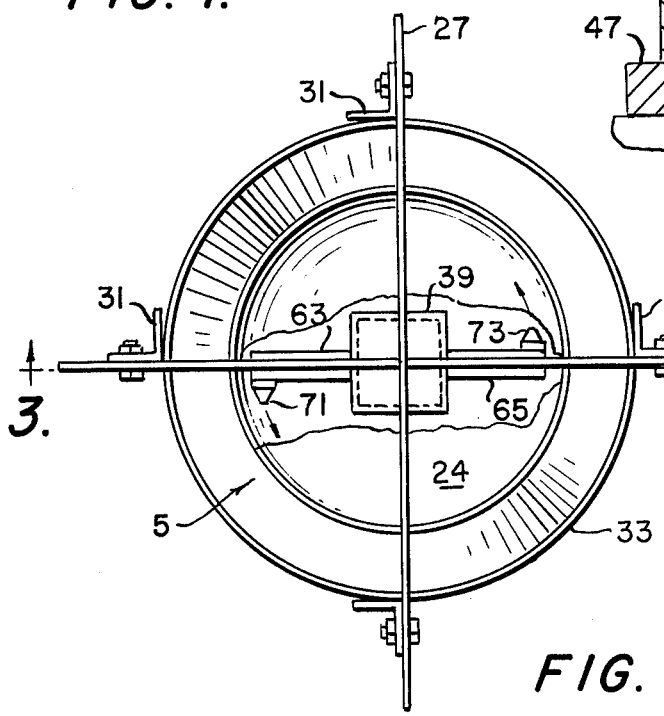
FIG. 2 is in enlarged plan view of the device of FIG. 1, with its upper plate cut away partially in section taken on the line 2—2 thereof.
Figure 3:
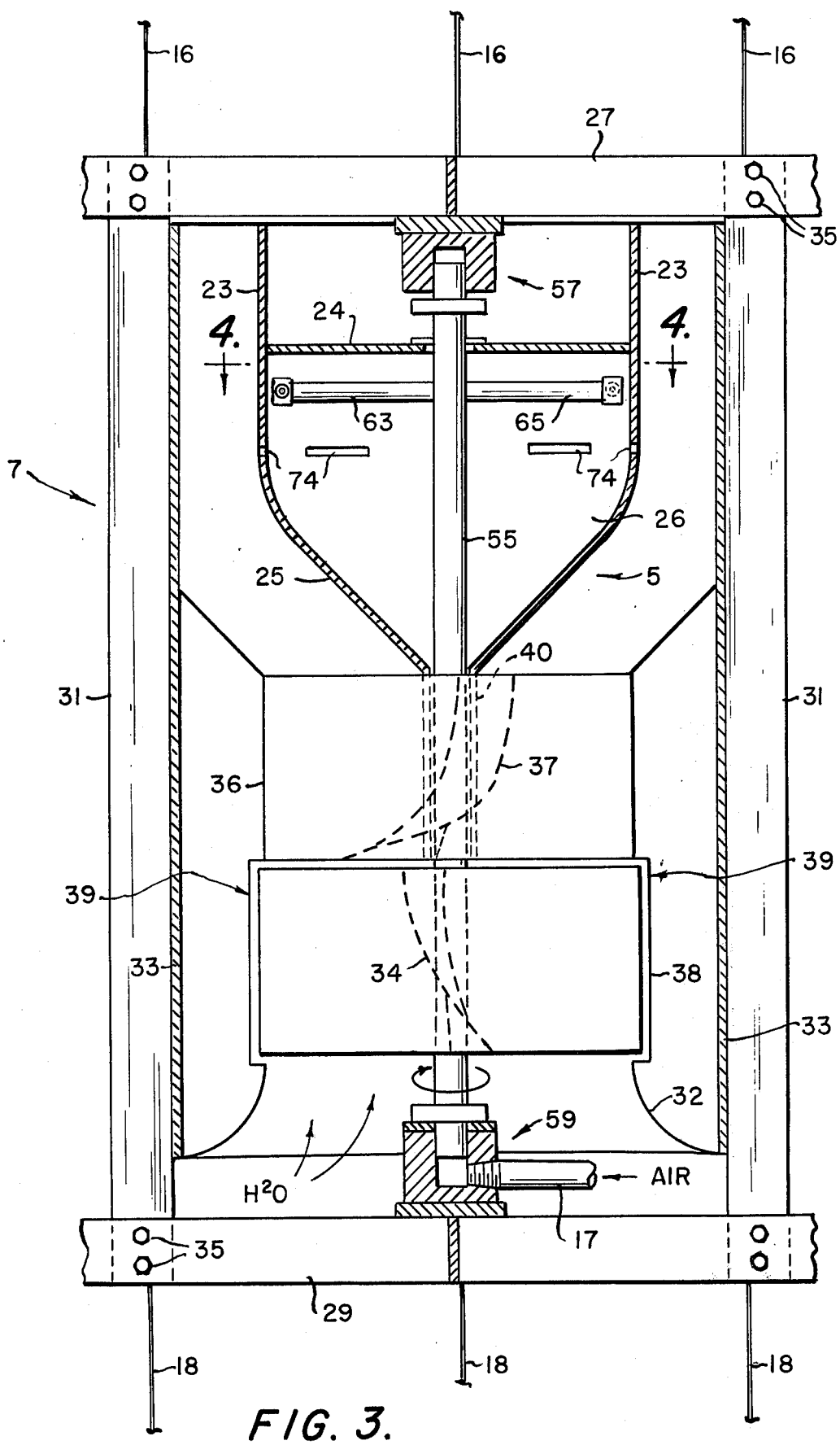
FIG. 3 is an enlarged fragmentary vertical sectional view, taken on the line 3—3 of FIG. 2.

The structural details of device 1 shall be more clearly seen with reference now to FIGS. 2 and 3. Shroud 5 may assume an upwardly opening configuration composed of an upper cylindrical section 23 and a joined second lower downwardly tapered funnel section 25. The open end of section 23 is sealed by a flat plate 24 which acts to prevent water from entering the plenum region 26. It is to be understood that while a specific configuration has been described for shroud 5, other types of elongated configurations may be entirely suitable for the practice of the present invention provided that shroud 5 includes a substantially water tight plenum and smooth outer walls to separate and deflect the water axially and upwardly. For ease in understanding the invention, the plate 24 in FIG. 2 has been shown as partially cut away around its center section.

Shroud 5 is supported by frame 7 which may include a plurality of brace members disposed in a substantially rectangular configuration. For example, frame 7 may include an upper cross-brace 27, a lower cross-brace 29, and four vertical braces 31. Shroud 5 is supported within frame 7 and vertical braces 31 are secured to braces 27 and 29 by bolts 35 or similar fastening means and welded at their other ends to the outer surface of cylindrical tube or outer shell section 33. Immediately within the supporting braces 31 is an outer cylindrical length of pipe 33 in which the shroud is rigidly held. A circular bell-mouth 32 lower opened end allows water to flow into the device so as to minimize energy losses. After entering, the water encounters a rotating pump impeller 38 which has 12 identical sloped blades 34 supported by an inner hub and an outer ring. These blades are rigidly attached to their hub which is in turn rigidly attached to the rotatable hollow drive shaft 55. An outer ring 39 is offset into the body wall so that its inside diameter is almost the same as the diameter of the outer edges of the blades of impeller 38. At the next stage, the flow enters the guide vanes section 36 with its six identical guide vane blades 37. These vane blades line up with the edges of the lower impeller blades. This guide is loosely mounted on the drive shaft so that the drive shaft freely rotates within its vertical inner cylindrical hub 40. The vanes are fixedly attached to the outer shell 33. In this way when the drive shaft rotates, water from the impeller blades flows through them. The purpose of this guide vane is to take the swirl out of the flow received from the impeller and transform it to a controlled axial upwardly directed flow. This transformation of the turbulent flow greatly increases design efficiency as the very object of the invention is to create an upward axial flow of water.

The axial flow of water from the guide vanes then moves around the outer surfaces of the shroud 5 towards the upper water surface. Within the shroud 5 is the reactive propulsion means 61 with its two arms 63 and 65. As best shown in FIGS. 4 and 5, these arms have hollow interiors which are in fluid communication with the interior of drive shaft 55. A pair of nozzles 71 and 73 are provided at the outer respective ends of the arms 63 and 65. These two nozzles are disposed perpendicular to the longitudinal extend of the arms when viewed from above (FIG. 4) and are further directed so that air exiting therefrom will flow in opposite directions. In this manner, the arms are caused to rotate in a circular horizontal path in plenum 26 when pressurized air from pump 11 via conduit 17 and shaft 55 is supplied. The small exhaust holes 74 allow accumulated air to leave the shroud's plenum. The fact that these arms are rotating in air, and not water, eliminates significant drag and energy losses to allow easy rotation of the connected drive shaft thereby.

FIGS. 6a and 6b indicate the top and side views of one of the twelve identical impeller blades. These blades are equally spaced around the impeller's central hub and are closely placed so that the bottom of each succeeding blade, except for a small gap, immediately follows the top of the next adjacent blade. Only one of each of these blades is shown for purpose of simplification. To get an idea of the relative angles and sizes involved, if the diameter of the conduit carrying the fluid in shaft 55 were one inch and if the greatest vertical height of the blade was 6 inches where attached to the shaft, and if the radius from the center of the hub to the outer edge of the blade was 6 inches, then the blade shape could be defined using the blade profile taken along five radii. FIG. 6b indicates the vertical slope of the corresponding arch lengths wherein the six inch arc would be represented by the least sloped line which terminates furthest from the hub and the progressively smaller arcs (4.8 inch, etc.) the stepper sloped lines beginning and progressively extending to its left side toward the drive shaft. In FIGS. 7a and 7b a similar set of views is illustrated for one of the six identical guide vanes. The largest shown arc in FIG. 7a is 6 inches with the more inward arcs being progressively smaller at 4.8, 3.6, 2.4, and 1.2 inches. The profile (FIG. 7b) with the least slope and whose terminal end is the furthest horizontal extension from the drive shaft would correspond to the 6 inch arc radius.

Figure 8:
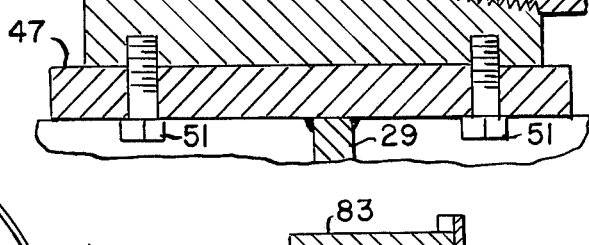
FIG. 8 is an elarged fragmentary vertical sectional view, through one of the reactive propulsion nozzles, taken on the line 8—8 of FIG. 4.

As seen in FIG. 8, nozzle 73 may be threadedly received within a right-angle connection joint 83 which is carried by the end of arm 65. Fluid flowing out arm 65 will be directed through joint 83 and out nozzle 73. Though nozzle 73 is depicted as a separate unit from joint 83, it is to be understood that these components can be made integrally and, further, may also be formed as a single unit integral with arm 65. The shape and design of nozzle 73 may take any suitable form desired and well known in the art for the purpose and function intended. This same description applies equally for the structural configuration and characteristics of nozzle 71 carried at the outer end of arm 63.

Figure 10:
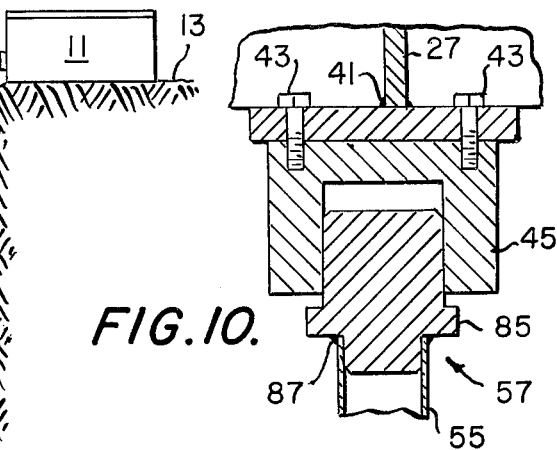
FIG. 10 is an enlarged fragmentary vertical sectional view, through the upper shaft support bearing.
Figure 9:
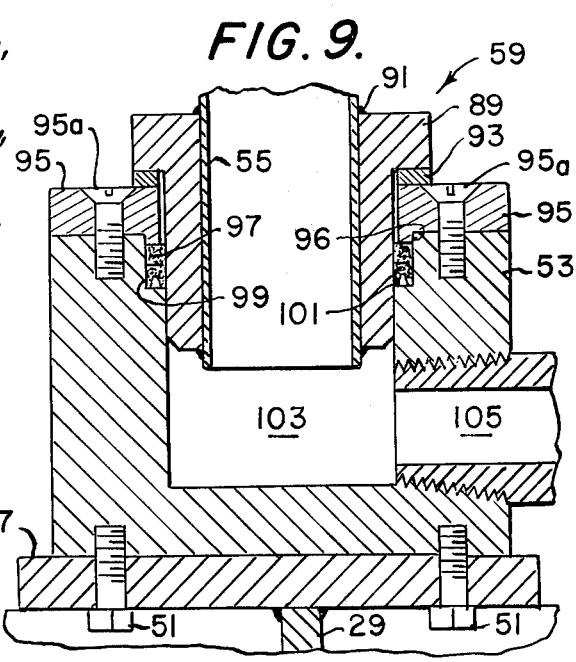
FIG. 9 is an enlarged fragmentary vertical sectional view, through the lower shaft support bearing.

Referring now to FIGS. 9 and 10, it can be seen that upper end 57 of shaft 55 is fitted with a plug 85 which is journalled within upper bearing 45 for free rotation therein. Plug 85 may be secured to the end of shaft 55 by welds 87. Thus, any fluid flow within shaft 55 will terminate against plug 85. Lower end 59 of shaft 55 is fitted within a flanged sleeve 89 which in turn is journalled for free rotation within lower bearing 53. Sleeve 89 may be secured to lower end 59 of shaft 55 by welds 91. A washer 93 is disposed between the flange portion of sleeve 89 and a plate 95 secured to the upper surface of lower bearing 53 by means of screws 95a. Plate 95 includes an annular downwardly depending flange 96 which defines an annular chamber 97 with an inwardly stepped recess 99 along the upper inner periphery of bearing 53. An annular gasket or seal assembly 101 is disposed within chamber 97 to prevent leakage of fluid between sleeve 89 and bearing 53. As seen in FIG. 9, the inner portion of bearing 53 is hollow to define a manifold chamber 103 which communicates directly with lower end 59 of hollow shaft 55. A threaded pipe joint coupling 105 is attached to bearing 53 for the purpose of conducting pressurized fluid into manifold chamber 103 from outlet conduit 17 of pump 11.

MODE OF OPERATION

The operation of destratification device 1 shall now be described in detail. Device 1 and its associated frame 7 may be anchored directly to the bottom 9 of the body of water 3 and suspended at a distance therefrom in a substantially vertical position. A pump 11, which pump can be of any type pump well known in the art and suitable for the function and manner of operation intended, is preferably situated remote from device 1 on ground surface 13 or other convenient dry land area. An inlet of pump 11 may be utilized to draw air from the atmosphere. Output conduit 17 of pump 11 is fitted onto bearing 53 by means of joint connection 105. When pump 11 is activated and pressurized fluid is sent into manifold chamber 103 of bearing 53, it is passed up through arms 63 and 65 for ejection out nozzles 71 and 73, respectively. The reactive forces imparted in opposite directions when fluid is ejected out nozzles 71 and 73 cause arms 63 and 65 to rotate. This in turn causes shaft 55 to rotate within its bearings 45 and 53. Because of the rotation of arms 63 and 65, the impeller blades 34 rigidly attached to the same shaft serve to push or pump water axially through the shell 33, the guide vanes 37, and around shroud 5 from the lower end to the upper end of the shell.

The rate of axial flow around shroud 5 may also be controlled by varying the pressure of fluid sent to device 1 through output conduit 17 for ejection out nozzles 71 and 73, thereby controlling the rotation speed of arms 63 and 65.

Accordingly, by virtue of the operation of device 1 as described, destratification of water quality parameters such as temperature, dissolved oxygen, chemicals and the like, within water body 3 may be accomplished so that such parameters may be uniformly distributed throughout water body 3 to better promote and maintain aquatic life and ecology.

It is to be further understood that the forms of the invention herein shown and described are to be taken as preferred embodiments of the same, and that various changes in the shape, size, arrangement of parts and applications may be resorted to, without departing from the spirit of the invention or scope of the subjoined claims.

What is claimed is:

1. A destratification device for controlling water quality parameters in a body of water, which device comprises, in combination:
    an elongated hollow open ended outer housing;
    an elongate shroud having a smooth outer surface and an interior, mounted in the housing plenum;
    means for supporting the housing and shroud in a substantially vertical position within the body of water with their lower ends spaced from the bottom thereof;
    a rotatable drive shaft having a hollow portion disposed coaxially within the center of the shroud and in fluid communication with its plenum;
    reactive propulsion arm means mounted on said shaft and operable by pressurized fluid flowing through the hollow portion of the shaft; for rotating said shaft;
    impeller means carried by the shaft for moving water axially around the exterior of the shroud when the shaft is rotated; and
    a source of pressurized fluid for supplying fluid to said propulsion means through said shaft.

2. The device of claim 1 wherein the ends of the shaft are journalled in the housing for rotation within bearings disposed adjacent the opposite ends of the outer housing.

3. The device of claim 1 wherein the shroud has an upper cylindrically shaped outer surface and a lower surface whose ends converge toward the shaft.

4. The device of claim 2 wherein the reactive propulsion means includes:
    a. at least one hollow arm extending radially from the hollow portion of the shaft; and
    b. a tangentially directed nozzle carried adjacent the outer free end of the arm.

5. The device of claim 4 wherein,
    a. the shaft is hollow in its axial direction and communicates internally with the hollow arm; and
    b. one end of the shaft is open for receiving pressurized fluid through its associated bearing.

6. The device of claim 5 wherein said source of pressurized fluid is a pump for supplying a source of pressurized fluid from the pump output to the bearing associated with the open end of the shaft.

7. The device of claim 6 wherein the pump includes means for supplying ambient air from adjacent the upper portion of the body of water to the pump intake.

8. The device of claim 1 wherein the impeller means includes a plurality of substantially identical blades below the shroud movable in unison with said drive shaft.

9. The device of claim 3 wherein the reactive propulsion means is disposed in the cylindrical portion of the shroud.

10. The device of claim 2 wherein the housing for supporting the shroud includes a generally rectangular framework having crossed braces at its opposite ends.

11. The device of claim 1 also including guide vane means located between the impeller means and shroud on said shaft for reducing the turbulence of the water exiting from the impeller to cause it to flow in a more vertical direction.

12. The device of claim 11 wherein said guide vane means comprises a plurality of blades which are fixedly mounted to the housing, said blades being impinged by the water passing through them.

* * * * *